(12) United States Patent
Reluzco et al.

(10) Patent No.: US 6,290,232 B1
(45) Date of Patent: Sep. 18, 2001

(54) RUB-TOLERANT BRUSH SEAL FOR TURBINE ROTORS AND METHODS OF INSTALLATION

(75) Inventors: George E. Reluzco, Schenectady; Thomas J. Farineau, Schoharie; Lawrence E. Rentz, Clifton Park; Dennis R. Ahl, Sprakers, all of NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/441,004

(22) Filed: Nov. 16, 1999

(51) Int. Cl.$^7$ ........................................ F16J 15/44

(52) U.S. Cl. ............................... 277/355; 277/415

(58) Field of Search ........................... 272/409, 415, 272/355, 421, 416

(56) References Cited

U.S. PATENT DOCUMENTS

| | | |
|---|---|---|
| 768,593 | 8/1904 | Emmet et al. . |
| 779,785 | 1/1905 | Junggren . |
| 910,472 | 1/1909 | Junggren . |
| 957,887 | 5/1910 | Junggren . |
| 980,282 | 1/1911 | Junggren . |
| 1,352,277 | 9/1920 | Junggren . |
| 1,352,278 | 9/1920 | Juggren . |
| 1,505,647 | 8/1924 | Junggren . |
| 1,505,924 | 8/1924 | Warren . |
| 1,536,014 | 4/1925 | Junggren . |
| 1,594,838 | 8/1926 | Kigresse . |
| 1,651,855 | 12/1927 | Warren . |
| 1,670,071 | 5/1928 | Junggren . |
| 1,895,930 | 1/1933 | Junggren . |
| 2,336,323 | 12/1943 | Warren . |
| 2,600,991 | 6/1952 | Hargrove . |
| 2,709,338 | 5/1955 | Morley et al. . |
| 3,186,168 | 6/1965 | Ormerod et al. . |
| 3,463,498 | 8/1969 | Bill . |
| 3,759,038 | 9/1973 | Scalzo et al. . |
| 4,195,476 | 4/1980 | Wood . |
| 4,202,554 | 5/1980 | Snell . |
| 4,358,120 | 11/1982 | Moore . |

(List continued on next page.)

FOREIGN PATENT DOCUMENTS

| | | |
|---|---|---|
| 2938-484 | 3/1981 | (DE) . |
| 0453315 A1 | 10/1991 | (EP) . |
| 2 191 825 A | 12/1987 | (GB) . |
| 2 301 635 | 12/1996 | (GB) . |
| 421302 | 5/1947 | (IT) . |
| 3-209068 | 9/1991 | (JP) . |
| WO92/05378 | 4/1992 | (WO) . |

OTHER PUBLICATIONS

Positive Pressure Variable Clearance Packing, Morrison et al.,; GE Turbine Reference Library, 5/90.

*Primary Examiner*—Robert J. Sandy
*Assistant Examiner*—Matthew Rodgers
(74) *Attorney, Agent, or Firm*—Nixon & Vanderhye

(57) ABSTRACT

A rotor shaft of a steam turbine is provided with a dovetail-shaped groove. A plurality of inserts are received in the groove through an entry slot at a predetermined circumferential location. Each insert has a sealing surface which, when all inserts are disposed in the groove, form a continuous sealing surface about the rotor shaft. Pins are employed to retain the final insert and, hence, all inserts in the groove by connecting the final insert either to the rotor shaft or to adjacent inserts. In this manner, heat generated by the brush seal bristles bearing on proud portions of the rotor sealing surface is substantially uniformly distributed about the inserts prior to any heat transfer to the rotor. To the extent heat is transferred to the rotor, the temperature distribution is substantially uniform whereby bowing of the rotor due to differential circumferential heating by brush seal contact with proud portions of the rotor is avoided.

15 Claims, 4 Drawing Sheets

OTHER PUBLICATIONS

| | | |
|---|---|---|
| 4,415,309 | 11/1983 | Atterbury . |
| 4,422,288 | 12/1983 | Steber . |
| 4,541,741 | 9/1985 | Woodbridge . |
| 4,567,730 | 2/1986 | Scott . |
| 4,580,346 | 4/1986 | Reichl . |
| 4,730,876 | 3/1988 | Werner et al. . |
| 4,756,536 | 7/1988 | Belcher . |
| 4,781,388 | 11/1988 | W Rhl . |
| 4,785,623 | 11/1988 | Reynolds . |
| 4,809,990 | 3/1989 | Merz . |
| 4,901,522 | 2/1990 | Commaret et al. . |
| 4,971,336 | 11/1990 | Ferguson . |
| 4,989,886 | 2/1991 | Rulis . |
| 5,002,288 | 3/1991 | Morrison et al. . |
| 5,026,252 * | 6/1991 | Hoffelner ........................ 415/174.2 |
| 5,029,875 | 7/1991 | Spain et al. . |
| 5,029,876 | 7/1991 | Orlando et al. . |
| 5,066,025 | 11/1991 | Hanrahan . |
| 5,074,748 | 12/1991 | Hagle . |
| 5,076,590 | 12/1991 | Steinetz et al. . |
| 5,090,710 | 2/1992 | Flower . |
| 5,106,104 | 4/1992 | Atkinson et al. . |
| 5,110,033 | 5/1992 | Noone et al. . |
| 5,114,159 | 5/1992 | Baird et al. . |
| 5,135,237 | 8/1992 | Flower . |
| 5,174,582 | 12/1992 | Ferguson . |
| 5,176,389 | 1/1993 | Noone et al. . |
| 5,181,728 * | 1/1993 | Stec ........................................ 277/53 |
| 5,181,827 | 1/1993 | Pellow et al. . |
| 5,192,084 | 3/1993 | Norbury . |
| 5,201,530 | 4/1993 | Kelch et al. . |
| 5,316,318 | 5/1994 | Veau . |
| 5,318,309 | 6/1994 | Tseng et al. . |
| 5,335,920 | 8/1994 | Tseng et al. . |
| 5,351,971 | 10/1994 | Short . |
| 5,374,068 | 12/1994 | Jewett et al. . |
| 5,400,586 | 3/1995 | Bagepalli et al. . |
| 5,401,036 | 3/1995 | Basu . |
| 5,474,305 | 12/1995 | Flower . |
| 5,474,306 | 12/1995 | Bagepalli et al. . |
| 5,480,165 | 1/1996 | Flower . |
| 5,503,405 | 4/1996 | Jewett et al. . |
| 5,509,780 | 4/1996 | Synfelt . |
| 5,524,340 | 6/1996 | Galbraith et al. . |
| 5,529,113 * | 6/1996 | Borowy ................................... 165/9 |
| 5,597,167 | 1/1997 | Snyder . |
| 5,599,026 | 2/1997 | Sanders et al. . |
| 5,630,590 | 5/1997 | Bouchard et al. . |
| 5,749,584 | 5/1998 | Skinner et al. . |
| 6,012,723 * | 1/2000 | Beeck .................................. 277/355 |
| 6,030,175 * | 2/2000 | Bagepalli ......................... 415/173.3 |
| 6,045,134 * | 4/2000 | Turnquist ............................ 277/347 |
| 6,131,910 * | 10/2000 | Bagepalli ........................... 277/355 |
| 6,131,911 * | 10/2000 | Cromer ................................. 27/355 |
| 6,139,019 * | 10/2000 | Dinc .................................... 277/355 |

\* cited by examiner

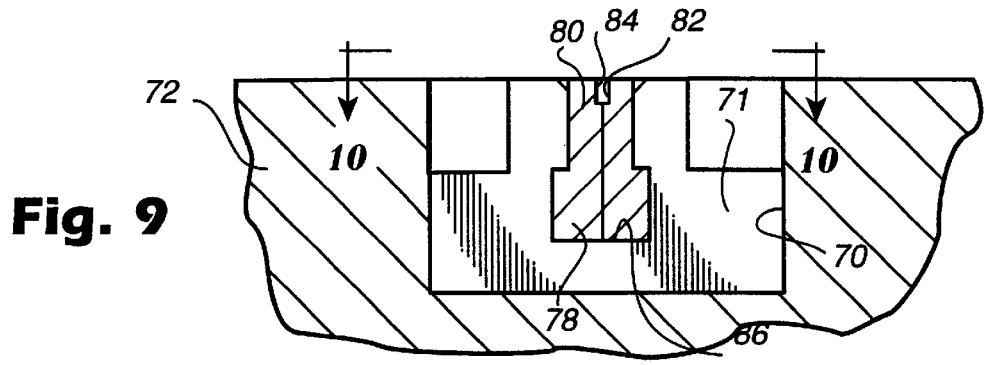
Fig. 9
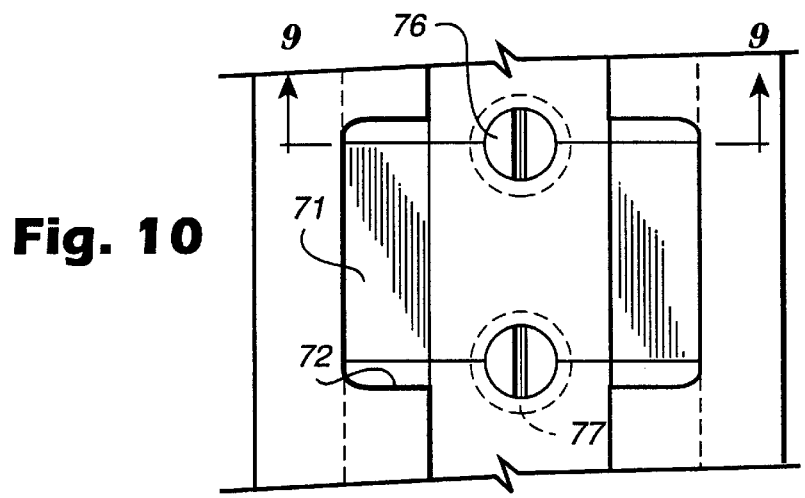
Fig. 10
Fig. 11
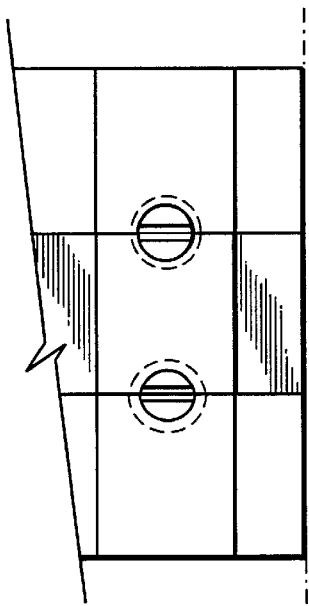
Fig. 12
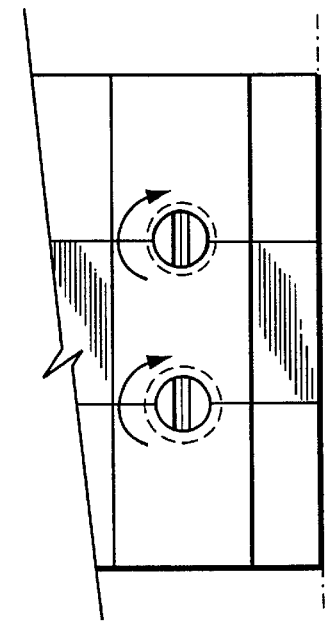

RUB-TOLERANT BRUSH SEAL FOR TURBINE ROTORS AND METHODS OF INSTALLATION

BACKGROUND OF THE INVENTION

The present invention relates to apparatus and methods for minimizing or eliminating non-uniform circumferential temperature distribution between a stationary brush seal and a rotary component, e.g., a turbine rotor.

BRIEF SUMMARY OF THE INVENTION

While the invention hereof is described particularly in relation to turbine rotors, it will be appreciated that the invention relates more generally to minimizing or eliminating non-uniform temperature distribution between a stationary brush seal and a rotary component. Turbine rotors, particularly steam turbine rotors for the generation of power, typically include a continuous solid elongated shaft carrying the turbine wheels and buckets. Proud portions, e.g., high spots, are often formed or occur on turbine rotors. Brush seals for sealing between a stationary component and a rotary component, e.g., a rotor, are designed for direct contact with the rotor surface during operation. The heat generated by the bristles rubbing against the rotating rotor and particularly the proud portions may lead to non-uniform circumferential temperature distribution on the rotor surface and consequent bowing of the rotor. That is, proud portions of the rotor become increasingly hotter than circumferentially adjacent portions of the rotor, resulting in non-uniform axial expansion of the rotor and hence a bow in the rotor. This can be particularly pronounced at rotor start-up in the absence of any rotor cooling. Rotor bowing can result in excessive vibration and may prevent proper turbine start-up. Consequently, there is a need to thermally isolate the rotor from the heat generated by the brush seal bristles rubbing against the sealing surface of the rotor to avoid non-uniform temperature distribution circumferentially about the rotor.

In accordance with a preferred embodiment of the present invention, a groove, preferably a dovetail-shaped groove, is provided about the circumference of the rotor at the axial location along the rotor at which the brush seal will contact the rotor. The groove includes an entry slot for receiving a plurality of inserts, preferably generally complementary in shape to the cross-sectional shape of the groove. The inserts are received in the groove through the entry slot and are circumferentially stacked one against the other about the groove. Each of the inserts has a sealing surface for contact by the bristles of the brush seal. A final closure insert is received in the entry slot and is pinned in place to either the rotor or to adjacent inserts. The final insert also has a sealing surface whereby the discrete sealing surfaces of the inserts about the circumference of the rotor form a substantially continuous sealing surface thereabout for engagement by the brush seal bristles.

It will be appreciated that any temperature variation generated by contact between the brush seal bristles and the sealing surfaces, for example, proud portions of the sealing surfaces, would propagate along the inserts substantially to the exclusion of the adjoining rotor. That is, while temperature variations may exist about the substantially continuous sealing surface of the inserts, the heat transfer to the adjoining rotor is substantially limited due to the interface between the inserts and the rotor. By the time heat transfers to the rotor, the temperature distribution about the inserts will be substantially uniform about the rotor with consequent substantially uniform heat transference to the rotor.

In a preferred first embodiment of the present invention, the groove in the rotor may be formed in a raised land or flange on the rotor. Consequently, pins may be inserted in an axial direction through the raised land or flange to engage and retain the final insert within the rotor groove, notwithstanding its location at the groove entry slot. In another preferred form, the rotor groove may be in a raised land or flange or recessed from the rotor surface with stem portions of the inserts projecting radially outwardly of the groove or rotor surface. The final insert may be secured to the adjacent inserts by inserting pins in complementary grooves between the final and adjacent inserts.

In a still further preferred form of the present invention, and particularly useful for grooves recessed within the rotor surface and wherein the insert sealing surfaces lie flush with the rotor surface, sets of pins may be used to secure the final insert to the rotor. Each pin has reduced and enlarged axially spaced diameter sections and is cut axially into halves. Complementary recesses are formed along opposite sides of the final insert and the registering end faces of the adjacent inserts. By locating a pair of pin halves in the registering faces of the adjacent inserts with the pin halves oriented such that each axial plane lies flush with its registering face, the final insert, also carrying pin halves along opposite faces thereof, is disposed through the entry slot. It will be appreciated that, upon insertion of the final insert, the axial plane of each pin half at each side of the final insert adjoins the registering axial plane of the pin half of the adjacent insert. This enables the pins to be rotated approximately 90°, thereby locking the final insert in the groove.

In a preferred embodiment according to the present invention, there is provided a seal assemblage comprising a rotary component having an axis of rotation, a plurality of discrete, circumferentially spaced elements connected to the rotary component and lying generally in a plane normal to the axis of rotation, the elements having discrete sealing surfaces defining a substantially continuous circumferentially extending sealing surface about the rotor, a component fixed against rotation and surrounding the rotary component, the fixed component including a brush seal comprised of a plurality of bristles for sealing engagement with the substantially continuous sealing surface of the rotary component, enabling substantially uniform temperature distribution circumferentially about and in the rotary component adjacent the elements.

In a further preferred embodiment according to the present invention, there is provided in a steam turbine having a rotor and a non-rotating component about the rotor carrying a brush seal for sealing engagement with the rotor, a method of substantially eliminating bowing of the rotor resulting from circumferential non-uniform distribution of heat about the rotor due to frictional contact between the brush seal and a proud portion of the rotor, comprising the steps of providing a groove in the rotor at an axial location corresponding to an axial location of the brush seal, disposing a plurality of inserts in the groove through an entry slot to the groove for engaging the brush seal and securing the inserts within the groove by engaging a retainer member with a final insert received in the entry slot and one of the rotor and an insert adjacent the final insert.

BRIEF DESCRIPTION OF THE DRAWINGS

FIG. 9 is a view similar to FIG. 1 illustrating a third preferred embodiment of the present invention and taken generally about on line 9—9 in FIG. 10;

FIG. 10 is a top plan view thereof taken generally about on line 10—10 in FIG. 9; and FIGS. 11 and 12 are top plan views of the final insert, respectively, before and after retention in the groove of the rotor.

DETAILED DESCRIPTION OF THE INVENTION

Figure 1:
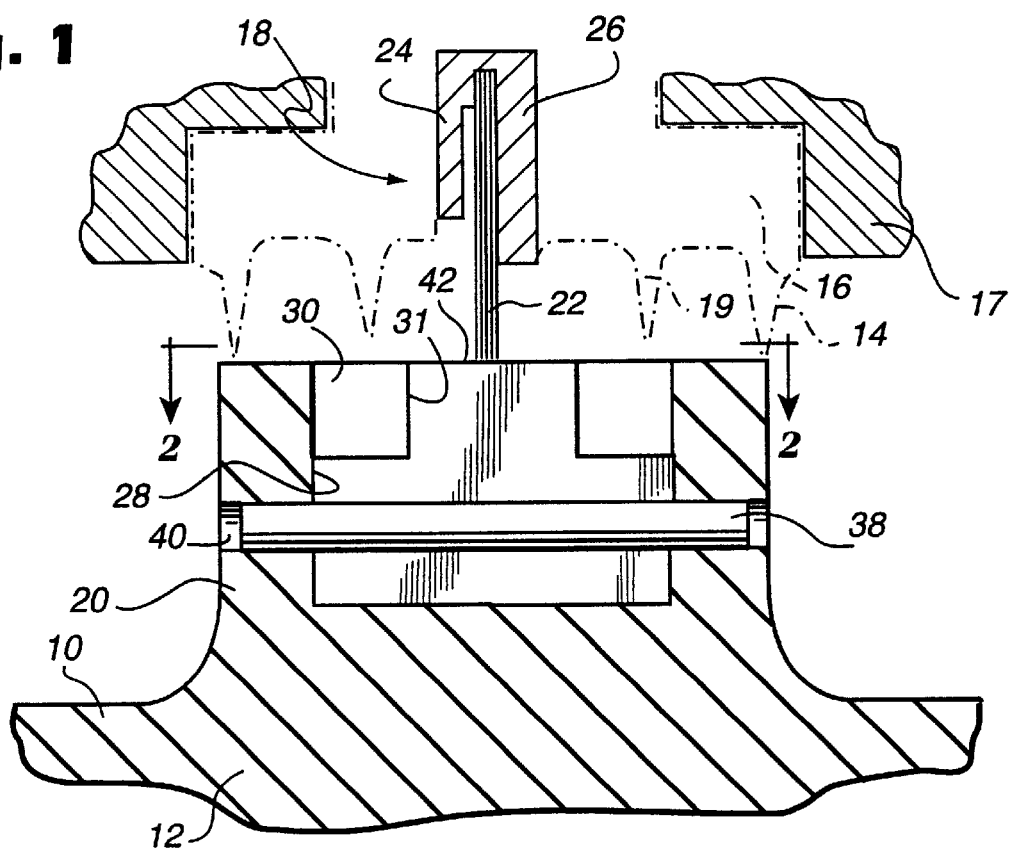
FIG. 1 is a fragmentary cross-sectional view of a portion of a rotor with a raised land illustrating an insert in sealing engagement with a brush seal and taken generally about on line 1—1 in FIG. 2.

Referring to FIG. 1, there is illustrated a rotor 10 comprised of a rotary component, e.g., a rotor shaft 12, which, in a preferred steam turbine environment, typically mounts buckets, not shown, whereby steam drives the rotor about an axis. It will be appreciated that the rotor shaft 12 is a continuous solid elongated piece of metal in contrast to the formation of a rotor in a gas turbine, which comprises a plurality of built-up wheels and disks bolted to one another. Labyrinth seals 14 are typically provided on packing ring segments 16 for sealing between a component fixed against rotation, e.g., a stationary component 17, and the rotary component, e.g., the rotary shaft 12.

Brush seals are employed at various locations along the rotor and, for effective sealing performance, lie in contact with the rotor throughout all phases of operation of the turbine. The brush seals thus form with the contact portion of the rotor a brush seal assemblage. Brush seals have also been used in combination with labyrinth seals. Thus, as illustrated in FIG. 1, a brush seal, generally designated 18, is carried by a traditional labyrinth seal packing ring segment 16 having a plurality of labyrinth teeth 19 projecting radially inwardly toward but out of contact with the rotor 12. The packing ring segments 16 are, in turn, carried by the stationary component 17 and typically comprise a plurality of arcuate segments arranged circumferentially about the rotor shaft 12. In this form of rotor 12, there is provided a raised land or flange 20 about which there is formed a sealing surface for the combined labyrinth/brush seal. The brush seal 18 comprises a plurality of preferably metal bristles 22 disposed between a pair of plates 24 and 26 extending circumferentially about the rotor within a groove of the packing ring segment 16.

Figure 2:
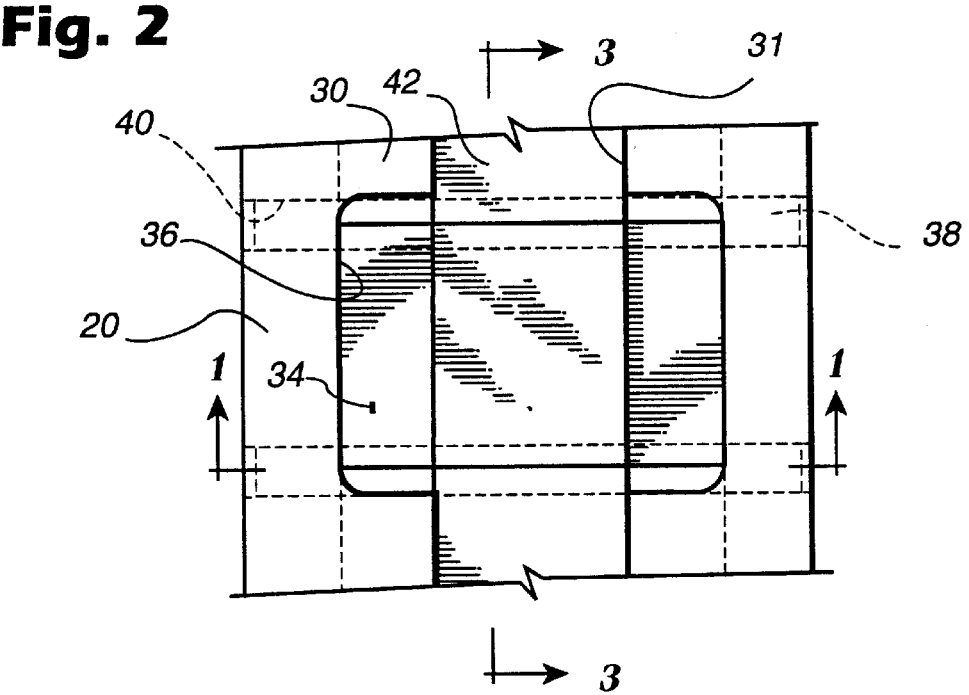
FIG. 2 is a top plan view thereof taken about on line 2—2 in FIG. 1.
Figure 3:
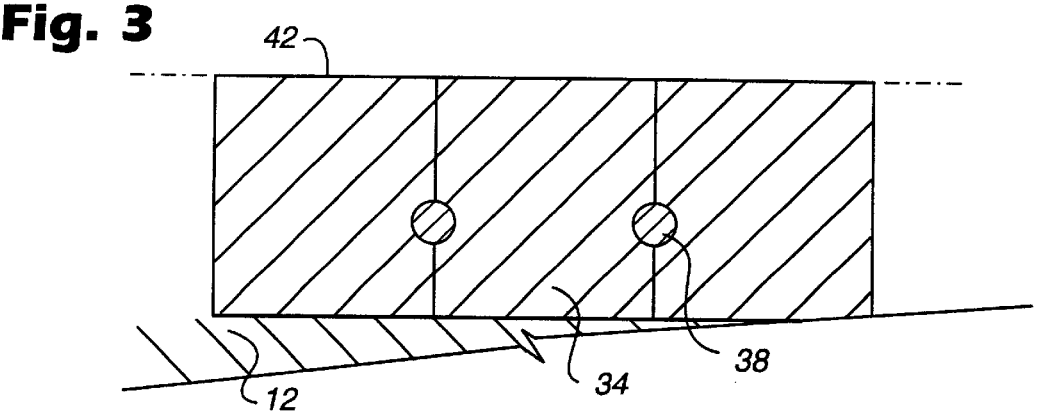
FIG. 3 is a cross-sectional view thereof taken generally about on line 3—3 in FIG. 2.
Figure 4:
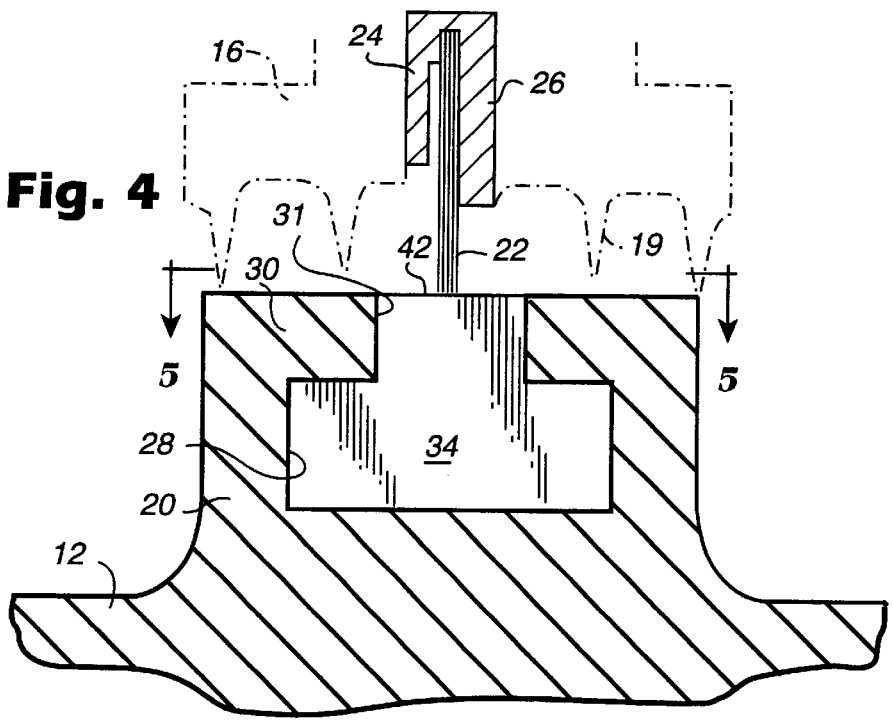
FIG. 4 is a cross-sectional view of the rotor groove at a location other than the entry slot and in-between the inserts in the groove.
Figure 5:
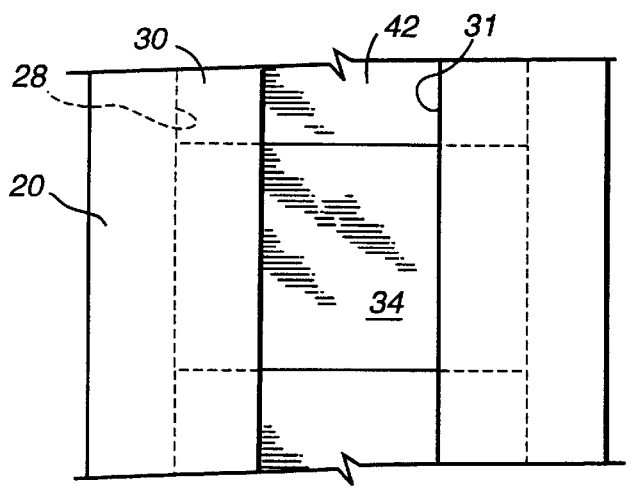
FIG. 5 is a fragmentary plan view of the inserts in the groove at locations other than the entry slot.

To prevent non-uniform distribution of heat about the rotor due to frictional contact between the tips of the bristles 22 and the sealing surface on the rotor, particularly at proud spots about the rotor surface, a groove 28 is formed in the rotor surface, particularly in the land or flange 20. Preferably, the groove is dovetail in shape, having axially facing flanges 30 with a circumferential opening 31 therebetween. In accordance with a preferred embodiment hereof, a plurality of elements, e.g., inserts 34 are disposed in the groove 28. The inserts 34 are generally complementary in circumferential cross-section to the dovetail-shaped groove 28. An entry slot 36 (FIG. 2) is provided at a selected circumferential position about the rotor shaft 12 and extends circumferentially and axially slightly in excess of the circumferential and axial extent, respectively, of the inserts. It will be appreciated that the inserts are disposed through the entry slot 36 and displaced circumferentially along the groove 28 into butting relation one with the other. The number of inserts to completely fill the circumferentially extending groove 28 may vary. For example, a 100 or more inserts may be used about the periphery of the rotor shaft, with the registering faces of adjacent inserts engaging one another.

In order to secure the final insert disposed through the entry slot 36, retainer members, preferably cylindrical pins 38 may be disposed on opposite sides of the final insert 34 into registering semi-cylindrical grooves formed in the registering faces of the final insert and the adjacent inserts. Thus, the pins 38 are inserted in an axial direction through aligned openings 40 in the raised flange 20 and suitably secured by staking or welding.

It will be appreciated that each of the inserts has a discrete sealing surface 42. When the inserts are finally retained in the groove, the sealing surfaces 42 form a substantially continuous sealing surface about the periphery of the rotor shaft 12. The sealing surfaces 42 also register radially with the tips of the bristles 22. To the extent there are proud portions on the continuous sealing surface of the inserts causing a non-uniform temperature distribution about those surfaces, the temperature variations tend to distribute themselves in a circumferential direction from one insert to the next such that a substantially uniform temperature distribution occurs around the inserts prior to substantial heat transfer to the rotor per se. Thus, by the time heat transfers to the rotor, the temperature distribution about the array of inserts is substantially uniform.

Figure 6:
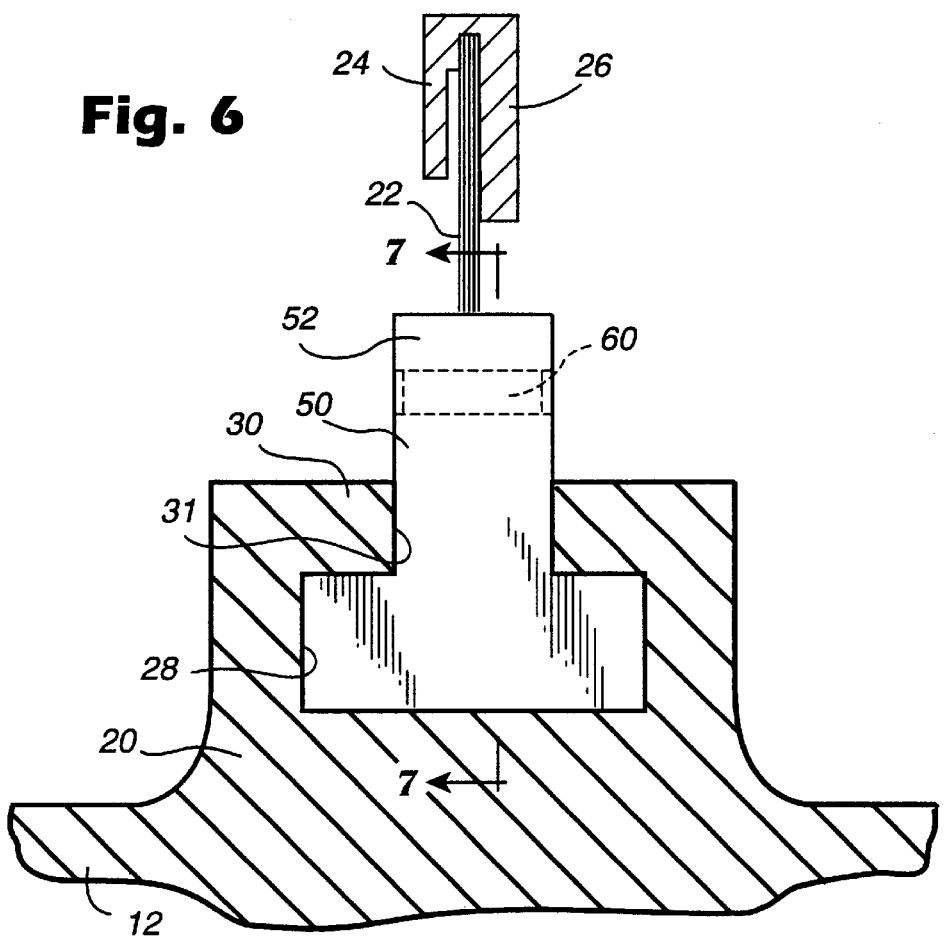
FIG. 6 is a view similar to FIG. 1 illustrating a second preferred embodiment of the present invention.
Figure 7:
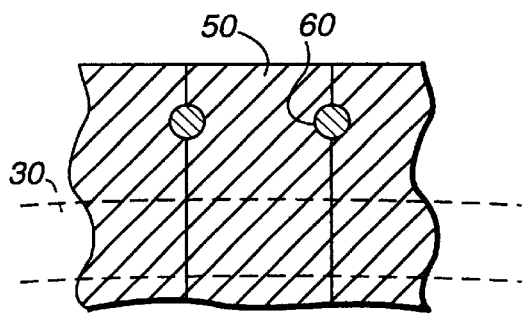
FIG. 7 is a cross-sectional view thereof taken about on line 7—7 in FIG. 6.

Referring to FIGS. 6 and 7, there is illustrated a further preferred form of the invention wherein each of the inserts 50 includes a radially extended stem 52. As in the prior embodiment, the inserts 50 are generally complementary in circumferential shape to the shape of the groove 28 in the flange of the rotor. Also as in the previous embodiment, the stem of each insert has a discrete sealing surface 54 which, in this form, projects radially outwardly of the radial extent of the flange 20. The discrete sealing surfaces 54 of the inserts form a substantially continuous sealing surface about the circumference of the rotor shaft 12.

The inserts are similarly introduced into the groove 28 as in the prior embodiment, particularly through an entry slot 36. When the final insert is received in the entry slot, the final insert, rather than being secured to the flange 20, is secured directly to adjacent inserts 50. Opposite sides of the final insert and each of the faces of the adjacent inserts have circumferentially registering openings, preferably semi-circular in configuration in an axial direction. Upon insertion of the final insert 50, a pair of preferably cylindrical pins 60 may be disposed in the registering semi-cylindrical openings between the final insert and the adjacent inserts to secure the final insert and adjacent inserts to one another, precluding removal of the final insert. It will also be appreciated that, similarly as in the previous embodiment, the discrete sealing surfaces 54 of the inserts 50 form a substantially continuous sealing surface about the rotor. The heat generated by the contact between the sealing surface and the brush seal bristles tends toward circumferential uniformity prior to substantial heat transfer to the rotor shaft. Consequently, heat transfer from the inserts to the rotor shaft is effected substantially uniformly about the rotor shaft.

Figure 8:
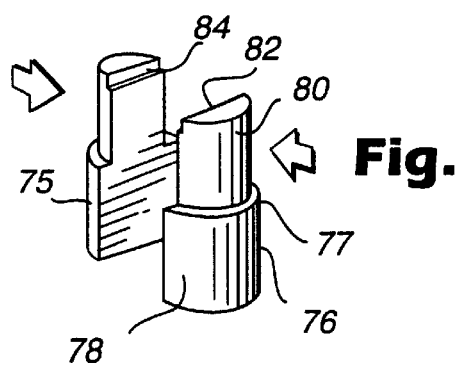
FIG. 8 is a perspective view of a retention pin formed in pin halves in accordance with a third preferred embodiment of the present invention.

Referring to the final preferred embodiment of FIGS. 8–12, a groove 70, preferably once again having a dovetail-shaped configuration, receives a plurality of inserts 71 complementary in shape to the dovetail configuration of the groove and through an entry slot 72 (FIG. 10). As illustrated in FIG. 8, the groove 70 is recessed from the surface of the rotor shaft 74. In order to retain the final insert 71 received through the entry slot 72 in the groove, a pair of retainer members, e.g., pins 76, one being illustrated in FIG. 7, are provided. Each pin 76 is provided in half-pin form with the pins 76 being divided along a diametrical axial plane of the pin to form pin halves 75 and 77. As illustrated in FIG. 8, each full pin 76 has enlarged and reduced diameter sections 78 and 80, respectively, with registering recesses 82 and 84 along the axial diametrical plane of the pin adjacent its outer end and at the end of the smaller diameter section 80. It will be appreciated that when the pin halves 75 and 77 are juxtaposed together with the diametrically axial planes flush against one another, a full circular axially stepped pin 76 is provided.

The final insert and a pair of adjacent inserts on opposite sides of the final insert have registering recesses 85 and 87 complementary in shape to the external surfaces of the pins. As illustrated in FIG. 9, the recesses have bottom flanges 86. That is, the registering faces of the final insert and the insert on each side of the final insert have registering recesses complementary in shape to the shape of the full pins.

In order to install the final insert, and with the adjacent inserts previously installed through the entry slot 72, a half-pin is provided in each of the spaced opposing faces of the inserts adjacent the location of the final insert. The half-pins are disposed such that the axial diametrical plane of the half-pin lies flush with the face of the insert facing in a circumferential direction. Another half-pin is inserted into the complementary-shaped recess on each of the circumferentially facing surfaces of the final insert. That is, the half-pins are seated on the flanges 86 with their faces registering with the circumferentially facing surfaces of the final insert. In this manner, the final insert can be inserted through the entry slot 72. Upon entry, as illustrated in FIG. 11, the axial diametrical planes of the half-pins mounted on the final insert and the adjacent inserts lie flush and coplanar with one another. By rotating the pins approximately 90°, for example, by inserting a screwdriver in the screw slot formed by recesses 82 and 84, the axial diametrical plane is shifted to lie in a plane normal to the axis of the rotor, as illustrated in FIG. 12. This rotation locks the final insert to the adjacent inserts via the pins. The pin halves can then be staked or welded to one another and to the inserts to prevent rotation.

As in the previous embodiments, each insert has a sealing surface facing circumferentially outwardly of the shaft against which the brush bristles bear. The sealing surfaces of the inserts thus form a substantially continuous sealing surface about the rotor shaft flush with the external surface of the shaft. In this manner, as in the previous embodiments, the temperature variations caused by proud portions of the inserts are distributed substantially uniformly in a circumferential direction about the inserts. The heat transferred from the inserts to the rotor shaft is thus substantially uniform about the shaft.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal assemblage comprising:
   a rotary component having an axis of rotation;
   a plurality of discrete, circumferentially spaced elements connected to said rotary component and lying generally in a plane normal to said axis of rotation, said elements having discrete sealing surfaces defining a substantially continuous circumferentially extending sealing surface about said rotor;
   a component fixed against rotation and surrounding said rotary component, said fixed component including a brush seal comprised of a plurality of bristles for sealing engagement with said substantially continuous sealing surface of said rotary component, enabling substantially uniform temperature distribution circumferentially about and in said rotary component adjacent said elements.

2. An assemblage according to claim 1 wherein said rotary component has a dovetail groove about said axis of rotation for receiving said elements, an entry slot for said groove at a predetermined circumferential location thereabout, a final discrete element for insertion into said groove through said entry slot, and a retainer member extending between said rotary component and said final discrete element for retaining said final element in said groove.

3. An assemblage according to claim 2 wherein said member comprises a pin extending between said final element and said rotary component.

4. An assemblage according to claim 2 wherein said rotary component includes a raised land containing said groove, said member comprising a pin engaging said final element and extending into said raised land.

5. An assemblage according to claim 2 wherein said rotary component includes a raised land containing said groove, said member comprising a pin engaging said raised land and along an edge of said final element, and a second pin engaging said raised land and along an opposite edge of said final element.

6. An assemblage according to claim 1 wherein said rotary component has a dovetail groove about said axis of rotation for receiving said elements, an entry slot for said groove at a predetermined circumferential location thereabout, a final discrete element for insertion into said groove through said entry slot, and a member extending between said final discrete element and at least one of a pair of said elements adjacent said final discrete element.

7. An assemblage according to claim 6 wherein said rotary member includes a raised land containing said groove, and a second member extending between said final discrete element and another of said pair of elements adjacent said final discrete element.

8. An assemblage according to claim 7 wherein said first and second members include generally cylindrical pins engaging in generally semi-cylindrical circumferentially registering slots between said final discrete element and said adjacent elements, respectively.

9. An assemblage according to claim 6 wherein said groove lies recessed below an outer surface of said rotary component and said sealing surface lies at a radius no greater than the outer surface of the rotary component on either side of the sealing surface.

10. An assemblage according to claim 6 wherein said member includes a pair of generally semi-cylindrical pin halves, each pin half having a planar face and an axial step, a generally complementary-shaped slot to said semi-cylindrical pin halves in each of registering faces of said final discrete element and one of a pair of elements adjacent said final element, said final element having a seat for engaging an end portion of one of said semi-cylindrical pin halves when said pin halves are received in said slots of the final element and said one adjacent element, respectively, said pin halves being rotatable in said slots to engage each said final element and said one adjacent element to preclude removal of said final discrete element from said groove through said entry slot.

11. In a steam turbine having a rotor and a non-rotating component about the rotor carrying a brush seal for sealing engagement with the rotor, a method of substantially eliminating bowing of the rotor resulting from circumferential non-uniform distribution of heat about the rotor due to frictional contact between the brush seal and a proud portion of the rotor, comprising the steps of:

providing a groove in the rotor at an axial location corresponding to an axial location of the brush seal;

disposing a plurality of inserts in said groove through an entry slot to said groove for engaging the brush seal; and securing the inserts within the groove by engaging a retainer member with a final insert received in said entry slot and one of said rotor and an insert adjacent said final insert.

12. A method according to claim 11 including providing a dovetail-shaped groove in the rotor and providing inserts generally complementary in shape to the dovetail shape of the groove.

13. A method according to claim 11 including securing the inserts within the groove by engaging the retainer member with the final insert and said rotor.

14. A method according to claim 11 including securing the inserts within the groove by engaging the retainer member with the final insert and said insert adjacent said final insert.

15. A method according to claim 14 wherein said retainer member includes a pair of generally semi-cylindrical pin halves, each pin half having a planar axial diametrical face and an axial step, said final insert and said adjacent insert having generally complementary slots to said pin halves and including the steps of inserting the pin halves into the respective slots of said final and adjacent inserts and rotating said pin halves in said slots such that each pin half engages both said final and adjacent inserts.

* * * * *